① United States Patent  
Hofele

(10) Patent No.: US 8,193,972 B2  
(45) Date of Patent: Jun. 5, 2012

(54) ADAPTIVE CALCULATION OF PULSE COMPRESSION FILTER COEFFICIENTS FOR A RADAR SIGNAL

(75) Inventor: Franz-Xaver Hofele, Donzdorf (DE)

(73) Assignee: EADS Deutschland GmbH, Ottobrunn (DE)

( * ) Notice: Subject to any disclaimer, the term of this patent is extended or adjusted under 35 U.S.C. 154(b) by 155 days.

(21) Appl. No.: 12/675,939

(22) PCT Filed: Sep. 1, 2008

(86) PCT No.: PCT/DE2008/001433  
§ 371 (c)(1),  
(2), (4) Date: Apr. 20, 2010

(87) PCT Pub. No.: WO2009/026911  
PCT Pub. Date: Mar. 5, 2009

(65) Prior Publication Data  
US 2010/0194626 A1     Aug. 5, 2010

(30) Foreign Application Priority Data

Sep. 1, 2007 (DE) .................. 10 2007 041 669

(51) Int. Cl.  
G01S 13/00 (2006.01)  
G01S 7/40 (2006.01)

(52) U.S. Cl. ........ 342/194; 342/159; 342/165; 342/173; 342/174

(58) Field of Classification Search .................. 342/159, 342/165, 173, 174, 175, 194, 202, 203  
See application file for complete search history.

(56) References Cited

U.S. PATENT DOCUMENTS  
4,901,082 A * 2/1990 Schreiber et al. ............... 342/89  
(Continued)

FOREIGN PATENT DOCUMENTS  
DE           42 30 558 A1      9/1992  
(Continued)

OTHER PUBLICATIONS

International Search Report dated Feb. 16, 2009 and translation of relevant portions thereof (4 pages).

*Primary Examiner* — Thomas H. Tarcza  
*Assistant Examiner* — Peter Bythrow  
(74) *Attorney, Agent, or Firm* — Crowell & Moring LLP

(57) ABSTRACT

In a method for adaptive calculation of pulse compression filter coefficients for a received signal in a radar installation, which received signal is evaluated with the aid of a complex pulse compression mismatch filter, a pulse compression filter coefficient set h(t) is calculated for an ideal theoretical received signal s(t) for a pulse compression mismatch filter, such that a pulse compression output signal results with a desired main lobe to side lobe ratio. A transformed set of pulse compression filter coefficients $H_{opt}(f)$ for the complex pulse compression mismatch filter $H_{opt}(f)$ is calculated for a distorted received signal using the following rule:

$$H_{opt}(f) = \frac{S(f) \cdot H(f) \cdot S_v^*(f)}{|S_v(f)|^2}$$

where  
S(f): the Fourier-transform of an undistorted received signal s(t),  
$S_v(f)$: the Fourier-transform of a distorted received signal $s_v(t)$,  
$s_v^*(f)$: the complex conjugate of $S_v(f)$,  
H(f): the Fourier-transform of the pulse compression mismatch filter h(t).

4 Claims, 4 Drawing Sheets

U.S. PATENT DOCUMENTS

| | | | |
|---|---|---|---|
| 5,059,966 A * | 10/1991 | Fujisaka et al. | 342/25 A |
| 5,552,793 A * | 9/1996 | McLeod et al. | 342/204 |
| 5,786,788 A * | 7/1998 | Schober et al. | 342/159 |
| 6,067,043 A * | 5/2000 | Faure et al. | 342/174 |
| 7,019,686 B2 * | 3/2006 | Hester et al. | 342/174 |
| 7,688,257 B1 * | 3/2010 | Christianson et al. | 342/174 |
| 8,049,663 B2 * | 11/2011 | Frank et al. | 342/189 |
| 2003/0179831 A1 * | 9/2003 | Gupta et al. | 375/296 |
| 2005/0190100 A1 * | 9/2005 | Hester et al. | 342/174 |

FOREIGN PATENT DOCUMENTS

| | | |
|---|---|---|
| EP | 0 427 206 A2 | 5/1991 |

* cited by examiner

ADAPTIVE CALCULATION OF PULSE COMPRESSION FILTER COEFFICIENTS FOR A RADAR SIGNAL

BACKGROUND AND SUMMARY OF THE INVENTION

This application is a national stage of PCT International Application No. PCT/DE2008/001433, filed Sep. 1, 2008, which claims priority under 35 U.S.C. §119 to German Patent Application No. 10 2007 041 669.7, filed Sep. 1, 2007, the entire disclosure of which is herein expressly incorporated by reference.

The invention relates to a method and apparatus for adaptive calculation of pulse compression filter coefficients for a received signal in a radar installation, which received signal is evaluated with the aid of a complex pulse compression mismatch filter wherein a pulse compression filter coefficient set h(t) is calculated for an ideal theoretical received signal s(t) for a pulse compression mismatch filter, such that a pulse compression output signal has a desired main-lobe-to-side-lobe ratio.

German patent document DE 42 30 558 A1 discloses a process for iterative calculation of pulse compression (PC) filter coefficients which is matched in a general form to an ideal theoretical signal (binary code, Barker code, linear frequency modulation, non-linear frequency modulation, polyphase code). The PC filter coefficients calculated using this iteration method have in this case been implemented in a fixed form.

With this method, however, it is not possible to react to signal changes (and therefore to signal deficiencies) which occur during radar operation, or to compensate for them for a high-quality pulse-compression image. These signal changes and signal deficiencies refer to certain reproducible changes to the signal (that is, changes which always recur with the same behavior). A number of options are indicated in the following text for these signal modifications.

1. The PC filter coefficients should be optimized and matched to specific components of the signal processing (that is, for example, to filters that are used). A signal which is passed through an entire signal processing chain in some cases has characteristics that differ from those of a theoretical signal. The PC filter should therefore not be optimized for an ideal theoretical transmission signal, but should be matched (adapted) to a received signal which has been filtered—according to the signal processing.

2. The PC filter should not be optimized for the normally preferred Doppler zero, but for one specific Doppler frequency. By way of example, this can be done for a PC application which takes place at the respective filter outputs after the Doppler processing.

3. The PC filter should be optimized for transmitter deficiencies. These may be caused, for example, by the C-mode operation of the power amplifier. In this case, beyond a specific signal amplitude, the transmitter amplifies completely and the signal enters saturation. In addition, as a result of passing through a transmitter such as this in the C-mode, the signal will in some cases have characteristics that differ from those of a theoretical signal.

4. Generalizing this to generally possible signal modifications: in paragraph 3, it is not sufficient to precisely study the transmitter behavior and then to match the PC filter coefficients to it. In fact, the transmitter behavior is also dependent on the frequency agility of the radar; that is, the transmitter has a different behavior at higher frequencies than at lower frequencies, resulting in significantly noticeable differences in the PC image.

PC filters of a conventional type can be matched to the transmitter behavior only at one frequency. However, if the signal does not change significantly with respect to the PC during a specific time window, then an online calculation of the PC filter coefficients for this time window could significantly optimize the PC image, in an adaptive form.

In its conventional form, in which PC filter coefficients that have been calculated are implemented in a fixed manner throughout the operation of the radar installation, the calculation of the PC filter coefficients is carried out using an iteration algorithm. The iteration process results on the one hand in a corresponding time duration for calculation of the filter coefficients. On the other hand, a certain amount of experience in the use of pulse compression is necessary, in order to allow the desired compressed pulse to be modeled specifically for actual complex-value signals. Effective PC side-lobe suppression can be achieved only if this modeling has been carried out carefully. In consequence it is virtually impossible to implement this process automatically without having to monitor it adequately. This conventional iteration technique is thus unsuitable for adaptive online calculation of the PC filter coefficients.

One object of the present invention is to provide a method which overcomes the above disadvantages of the prior art.

This and other objects and advantages are achieved by the method for setting PC filter coefficients according to the invention, in which such coefficients are adaptively determined for a received signal in a radar installation. To this end, the received signal is evaluated with the aid of a complex pulse compression mismatch filter, and a pulse compression filter coefficient set h(t) is determined for an ideal theoretical received signal s(t) for a pulse compression mismatch filter, such that a pulse compression output signal results with a desired main-lobe-to-side-lobe ratio. A transformed set of pulse compression filter coefficients $H_{opt}(f)$ for the complex pulse compression mismatch filter $H_{opt}(f)$ is determined for a distorted received signal using the following rule:

$$H_{opt}(f) = \frac{S(f) \cdot H(f) \cdot S_v^*(f)}{|S_v(f)|^2}$$

where
S(f): the Fourier-transform of an undistorted received signal s(t),
$S_v(f)$: the Fourier-transform of a distorted received signal $s_v(t)$,
$S_v^*(f)$: the complex conjugate of $S_v(f)$,
H(f): the Fourier-transform of the pulse compression mismatch filter h(t).

In the following text, s(t), h(t), $H_{opt}(f)$ should be understood to be vectors.

A process such as this for optimization and matching (adaptation) of the PC filter coefficients to the given received signal starts from the conventional iteration algorithm for calculation of PC filter coefficients in order to calculate a PC mismatched filter h(t) for an ideal theoretical received signal s(t) (that is, an "uncorrupted" received signal), such that a PC output signal g(t) is achieved with sufficiently good side-lobe separation. In other words: the variables s(t), h(t) and g(t) in the formula $$s(t) * h(t) = g(t) \tag{1}$$

are known in the time domain.

This then also applies to the above formula in the frequency domain:

$$S(f) \cdot H(f) = G(f) \quad (2)$$

where S(f), H(f) and G(f) are the transfer functions of s(t), h(t) and g(t).

According to the invention, an adaptive optimum PC filter $h_{opt}(t)$ which can be calculated online is sought for a received signal $s_v(t)$, (which, as ever, is "corrupted"; that is, it includes signal distortions and which may vary during radar operation), such that the PC results in a high-quality PC output signal in the form of a high side-lobe separation. Also, it should be possible to calculate $h_{opt}(t)$ online (that is, quickly and without any monitoring mechanism).

The aim is to produce the same PC output signal (and sufficiently well with respect to the main-lobe-to-side-lobe ratio (MSR)) by means of PC from the "corrupted" (distorted) signal $s_v(t)$ and the sought optimum PC filter $h_{opt}(t)$, as in the case of the PC filtering of the "uncorrupted" received signal s(t), therefore g(t).

The following are then obtained based on equations (1) and (2).

$$s_v(t) * h_{opt}(t) = g(t) \quad (3)$$

and $$S_v(f) \cdot H_{opt}(f) = G(f) \quad (4)$$

where $s_v(t)$ and $S_v(f)$ are known. From the above equations, the transfer function $H_{opt}(f)$ of the sought optimum PC filter $h_{opt}(t)$ is thus obtained as:

$$H_{opt}(f) = \frac{S(f) \cdot H(f) \cdot S_v^*(f)}{|S_v(f)|^2} \quad (5)$$

wherein $S_v^*(f)$ is the complex conjugate vector of $S_v(f)$), and the impulse response $h_{opt}(t)$ is obtained as the IFFT result (IFFT=Inverse Fast Fourier Transform) of the transfer function $H_{opt}(f)$.

Other objects, advantages and novel features of the present invention will become apparent from the following detailed description of the invention when considered in conjunction with the accompanying drawings.

DETAILED DESCRIPTION OF THE INVENTION

The process according to the invention will now be described based, for example, on a pulse compression code which is very well known in the specialist world: the binary code of a length 13 Barker code. This is a real-value signal with coding +++++−−++−+−+ (+ representing +1 and − representing −1). This signal and this coding represent the "uncorrupted" signal s(t) in the above formulae.

Figure 1:
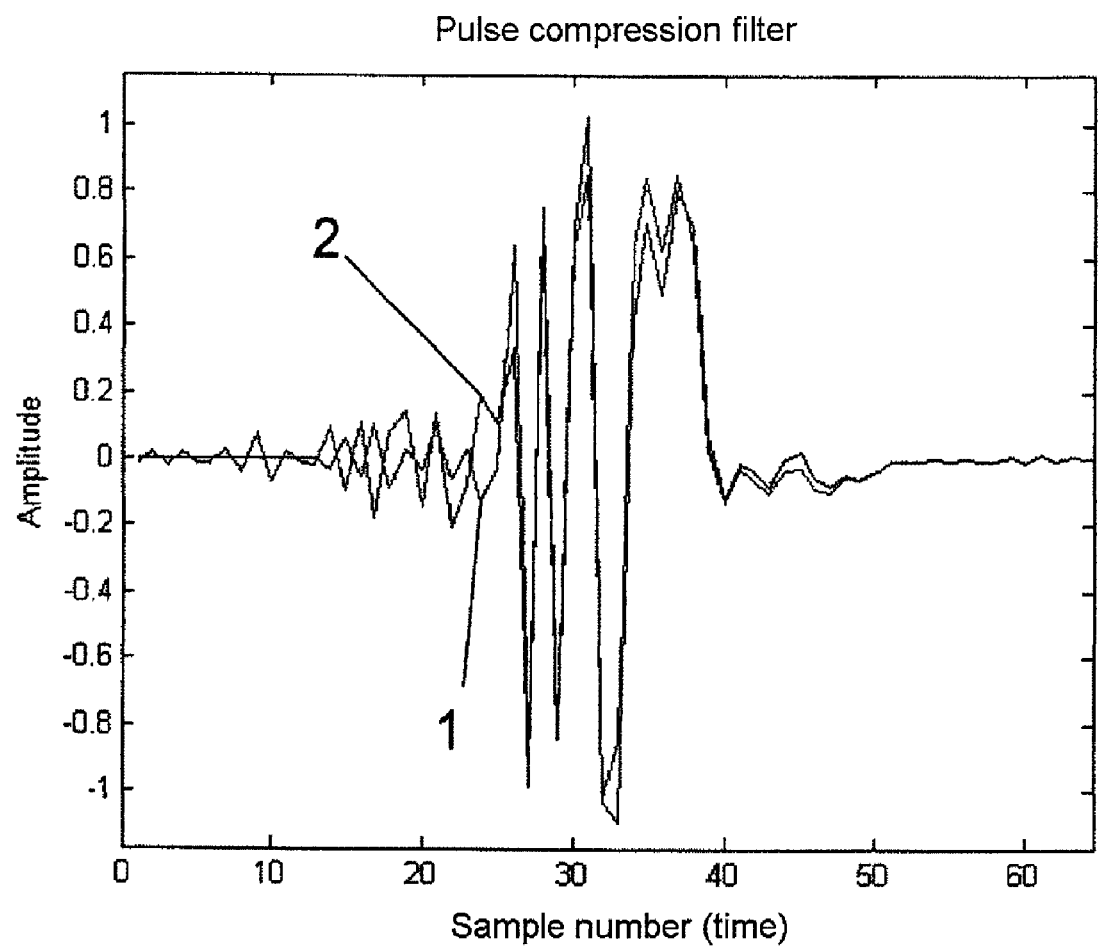
FIG. 1 is a graphic comparison of a PC filter according to the prior art with a PC filter according to the invention.

A PC-mismatched filter (MMF) of length 37 was established for s(t) using the conventional iteration method. This PC filter, which is designated by reference numeral 1 in FIG. 1, represents h(t) in the above expressions. This PC filter h(t), with pulse compression using s(t), produces the PC output signal g(t), whose magnitude is represented by reference numeral 1a in FIG. 2, and which has a high main-lobe-to-side-lobe ratio (MSR) of 42.3 dB. In addition, this PC output signal exhibits a highly homogeneous side-lobe behavior, which is highly advantageous for subsequent CFAR-circuits.

By way of example, the signal $s_v(t)$ is produced as the "corrupted" signal, comprising 14 sub-pulses according to the coding +++++++−−++−+−+ rather than 13 sub-pulses in s(t). In this context, the aim was to find a PC-MMF $h_{opt}(t)$ such that $s_v(t)$, for pulse compression with $h_{opt}(t)$ results in effectively the same PC output signal g(t) as the PC of s(t) with h(t).

Figure 2:
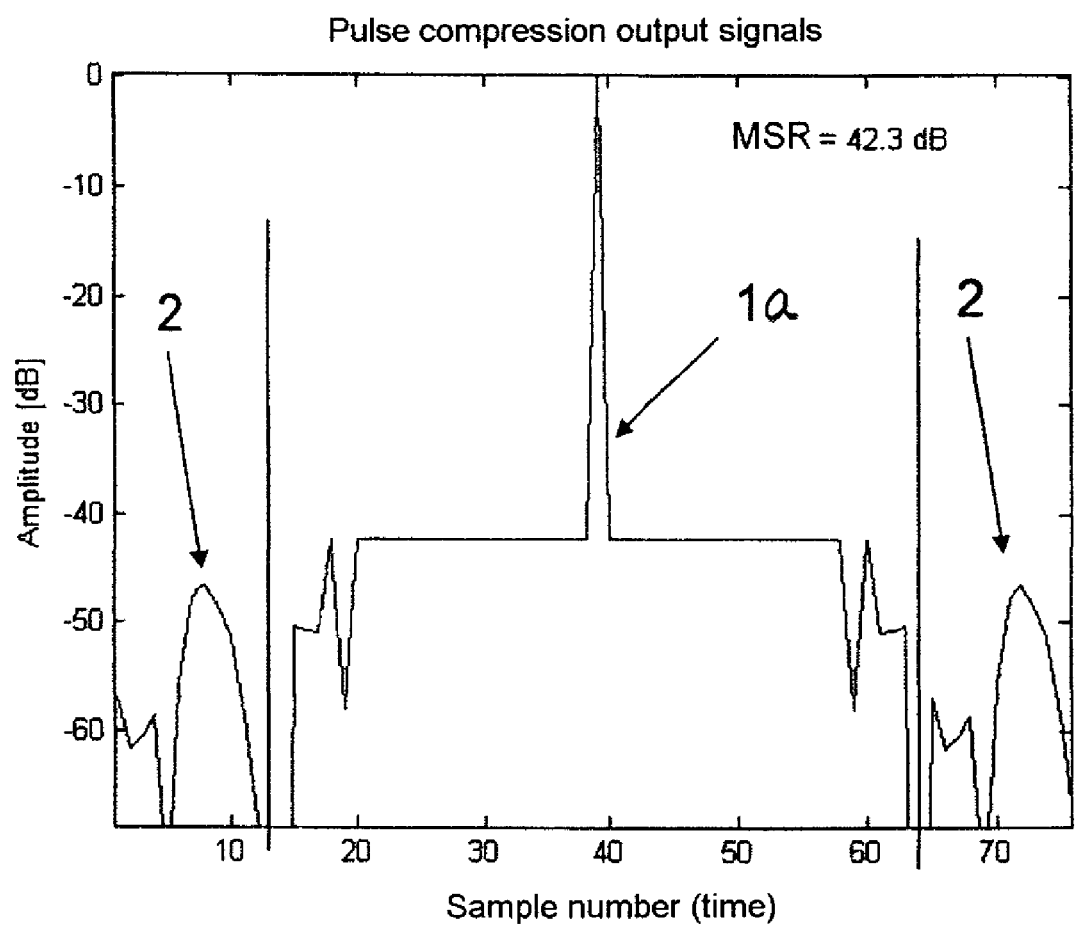
FIG. 2 shows the profile of a PC output signal calculated according to the invention.

If the method according to the invention is applied to the present problem, then the PC filter illustrated by reference numeral 2 in FIG. 1 of length 64 is obtained as $h_{opt}(t)$, from which the PC output signal 2 in FIG. 2 is derived.

As can be seen in FIG. 1, the essence of the PC result is that the curve 1 lies exactly on the curve 2. The curve 2 can be seen with respect to the curve 1 only at the edges of the PC image, because of the longer PC filter. It was therefore possible to verify what had been predicted purely theoretically, by means of this example.

Figure 3B:
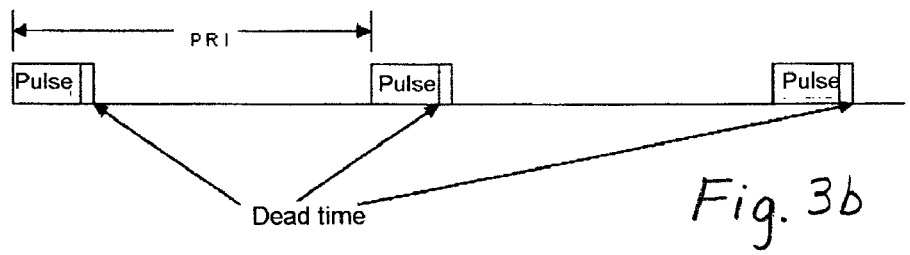
FIGS. 3a and 3b show the circuit of a radar installation having a component which has the invention, and a pulse diagram, respectively.
Figure 3A:
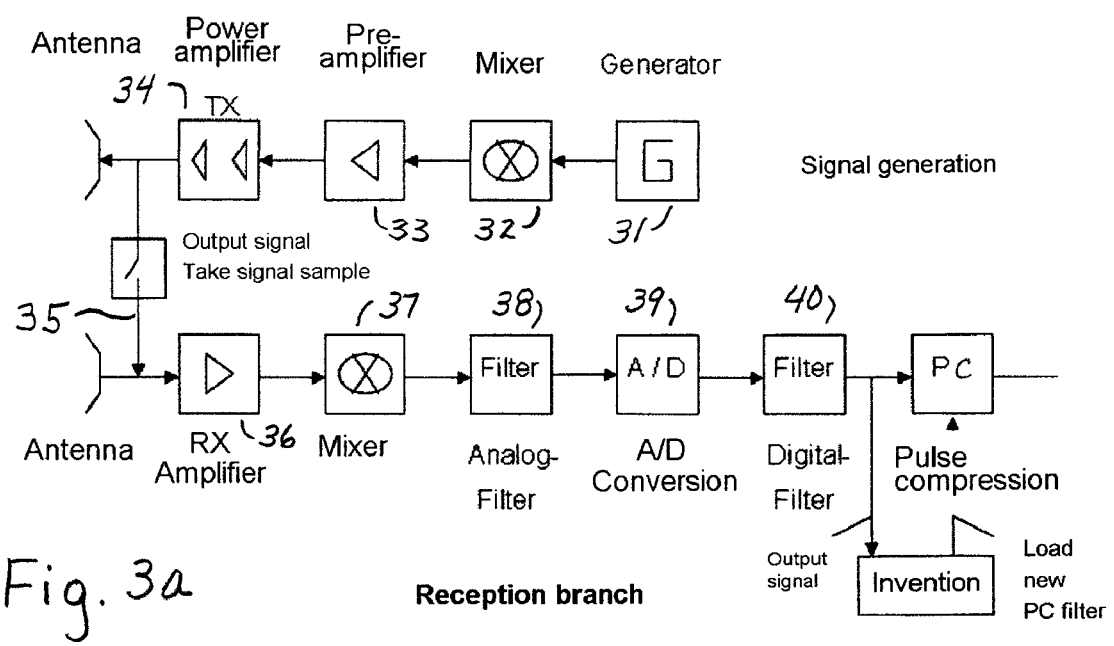

FIG. 3a is a schematic illustration of a radar installation, showing how an online calculation of the PC filter coefficients according to the invention can be achieved. For this purpose, a signal sample is taken after the signal preprocessing in the signal generation branch, at predeterminable time intervals. The signal preprocessing essentially comprises the actual signal generation 31, mixer 32, preamplifier 33 and power amplifier 34. Once the signal has passed through these components of the signal preprocessing, a signal sample 35 is output and is supplied to the reception branch during the dead time (FIG. 3b) of the pulse. In addition to a power amplifier 36, the signal sample passes through the major components of the signal processing in the reception branch, which are in general an antialiasing filter (including an analog filter 38, an A/D converter 39 and a digital filter 40) that governs bandwidth, and a mixer 37 that is required. The resulting signal sample corresponds to the received pulse to be expected before the PC. This is then used for the online calculation using the above formula (the theoretical signal and its associated PC filter already being available), and in this way the pulse compression filter is adapted (matched) from time to time to the existing signal waveform.

Before the pulse compression PC, the signal sample sv(t) is fed into the "invention" component, in which the transfer functions S(f) and H(f) are already stored. The online PC filter $h_{opt}(t)$ is then determined using the above expression:

$$H_{opt}(f) = \frac{S(f) \cdot H(f) \cdot S_v^*(f)}{|S_v(f)|^2} \quad (5)$$

and by means of IFFT, and is used for the adaptive PC.

Figure 4:
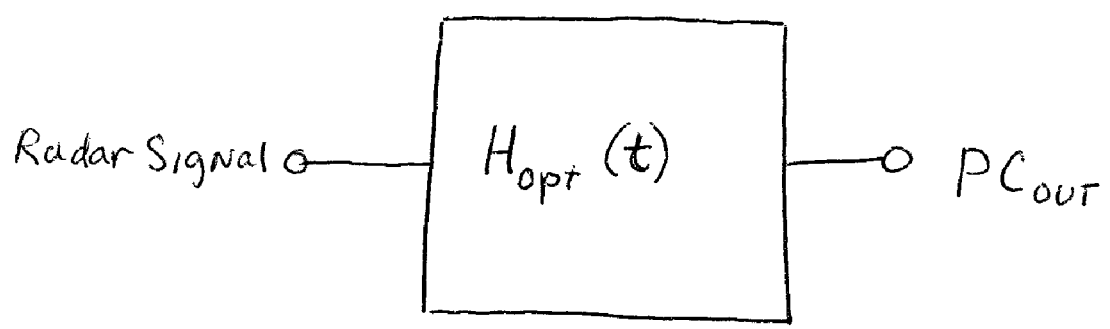
FIG. 4 is a schematic block diagram of a complex pulse compression mismatch filter according to the invention.

FIG. 4 is a schematic block diagram of a PC mismatch filter according to the invention, in which the pulse compression filter coefficients have been set by the method according to the invention. The impulse response $h_{opt}(t)$ is obtained as the inverse Fast Fourier Transform of the transfer function $H_{opt}(f)$ as defined in equation (5) above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for adaptive calculation of pulse compression filter coefficients for a received signal in a radar installation, which received signal is evaluated with the aid of a complex pulse compression mismatch filter, comprising:
   determining, using an electronic processor, a pulse compression filter coefficient set h(t) for an ideal theoretical received signal s(t) for a pulse compression mismatch filter, such that a pulse compression output signal results with a desired main-lobe-to-side-lobe ratio; and
   determining, using the electronic processor, a transformed set of pulse compression filter coefficients $H_{opt}(f)$ for the complex pulse compression mismatch filter $H_{opt}(f)$ for a distorted received signal, using the following rule:

$$H_{opt}(f) = \frac{S(f) \cdot H(f) \cdot S_v^*(f)}{|S_v(f)|^2}$$

where
S(f): Fourier-transform of an undistorted received signal s(t),
$S_v(f)$: Fourier-transform of a distorted received signal $s_v(t)$,
$S_v^*(f)$: complex conjugate of $S_v(f)$,
H(f): Fourier-transform of the pulse compression mismatch filter h(t).

2. The method as claimed in claim 1, wherein the pulse compression mismatch filter is in the form of a transversal filter.

3. The method as claimed in claim 1, wherein:
   a transmission signal is output from the radar installation; and
   during dead time of the radar installation, the transmission signal is input into a reception branch of a radar installation as a signal sample for a distorted received signal; and
   after signal preprocessing, the transmission signal is supplied to a component in which a pulse compression filter coefficient matrix $H_{opt}(f)$ is determined for the complex pulse compression mismatch filter.

4. A complex pulse compression mismatch filter comprising:
   an input device for receiving a reflected pulse train for a radar system;
   an output device which supplies compressed pulses; and
   a processor for determining a set of pulse compression filter coefficients for said filter by
      i) determining a pulse compression filter coefficient set h(t) for an ideal theoretical received signal s(t) for a pulse compression mismatch filter, such that a pulse compression output signal has a desired main-lobe-to-side-lobe ration; and
      ii) determining a transformed set of pulse compression filter coefficients $H_{opt}(f)$ for the complex pulse compression mismatch filter $H_{opt}(f)$ for a distorted received signal, using the following rule:

$$H_{opt}(f) = \frac{S(f) \cdot H(f) \cdot S_v^*(f)}{|S_v(f)|^2}$$

where
S(f): Fourier-transform of an undistorted received signal s(t),
$S_v(f)$: Fourier-transform of a distorted received signal $s_v(t)$,
$S_v^*(f)$: complex conjugate of $S_v(f)$,
H(f): Fourier-transform of the pulse compression mismatch filter h(t).

* * * * *